US005218289A

United States Patent [19]

Besson

[11] Patent Number: 5,218,289

[45] Date of Patent: Jun. 8, 1993

[54] ELECTRONIC DEVICE FOR THE MEASUREMENT OF TIME LAGS

[75] Inventor: Yves Besson, Paris, France

[73] Assignee: Thomson-CSF, Puteaux, France

[21] Appl. No.: 899,908

[22] Filed: Jun. 17, 1992

[30] Foreign Application Priority Data

Jun. 18, 1991 [FR] France ............................ 91 07423

[51] Int. Cl.[5] ............................ G01S 17/10

[52] U.S. Cl. ............................ 324/76.78; 324/617; 324/76.77; 328/223; 328/113

[58] Field of Search ................ 307/234; 328/113, 109, 328/223; 324/83 R, 83 A, 83 Q, 86, 617; 341/111

[56] References Cited

U.S. PATENT DOCUMENTS

| | | | |
|---|---|---|---|
| 3,680,118 | 7/1972 | Anthony | 324/83 A |
| 3,996,588 | 12/1976 | Besson et al. . | |
| 4,063,182 | 12/1977 | Besson . | |
| 4,139,301 | 2/1979 | Chaborski | 328/223 |
| 4,165,492 | 8/1979 | Motola et al. . | |
| 5,057,910 | 10/1991 | Judge | 324/83 R |

FOREIGN PATENT DOCUMENTS

| | | |
|---|---|---|
| 197801 | 10/1986 | European Pat. Off. . |
| 166106 | 1/1989 | European Pat. Off. . |
| 348898 | 1/1990 | European Pat. Off. . |

OTHER PUBLICATIONS

Patent Abstracts of Japan, vol. 12, No. 319 (P-751) (3166) Aug. 30, 1988 & JP-A-63 085 489 (Yokogawa Electric) Apr. 15, 1988.

Patent Abstracs of Japan, vol. 11, No. 260 (P-608) (2707) Aug. 22, 1987 & JP-A-62 063 885 (Yokogawa Electric) Mar. 20, 1987.

*Primary Examiner*—Kenneth A. Wieder

*Assistant Examiner*—Jose M. Solis

*Attorney, Agent, or Firm*—Pollock, VandeSande & Priddy

[57] ABSTRACT

The disclosure relates to the measurement of small time lags between a signal edge and a reference instant defined by another signal edge. It consists of the use of a signal edge for the prompting, by means of shock-excited resonating filters, of the appearance of two sinusoidal signals in quadrature constituting the components of a complex vector with a substantially constant module, the phase of said complex vector developing linearly in the course of time, and in deducing, from the value of this phase at the sampling reference instant, the value of the time lag between the reference instant and the signal edge. It can be applied more particularly to the measurement of short time lags of a few nanoseconds.

10 Claims, 3 Drawing Sheets

ELECTRONIC DEVICE FOR THE MEASUREMENT OF TIME LAGS

BACKGROUND OF THE INVENTION

The present invention relates to the measurement of small lags or differences in arrival times between a signal edge and an instant of reference preferably defined by another signal edge.

Such time lags or delays are generally measured by the processing of information elements acquired by direct sampling on the edge of the incident signal or on the edges of the incident signals. Such measurement entails major difficulties when time differences of the order of some nanoseconds or even of one nanosecond are to be detected, and when the edge or edges of the incident signals are short and liable to local deformations which are a cause of errors.

The present invention is aimed at enabling the measurement of very short time lags on one or more signal edges by getting rid of a certain number of faults related to the direct temporal exploitation of the signal edges.

To do so, it is proposed to reduce a time measurement to a phase-shift measurement by using a signal edge to prepare two components in quadrature of a rotating vector in which the passage of time is expressed by a linear phase variation.

SUMMARY OF THE INVENTION

An object of the invention is an electronic device for the measurement of the time lag between a reference instant and a signal edge that have a maximum time lag with respect to each other, said device comprising:

an input channel receiving the signal edge and comprising, in parallel, a first resonating filter which is tuned to a period T at least equal to the maximum time lag and generates a cosinusoidal signal V1 in response to an excitation by a signal edge, and a second resonating filter which is tuned to the same period T as the first resonating filter and generates a sinusoidal signal V2 in response to an excitation by a signal edge;

a sampling circuit, triggered at the reference instant, which simultaneously samples the output signals of the two resonating filters and delivers the values V1*r* and V2*r* and a computation circuit which receives the samples V1*r* and V2*r* coming from the sampling circuit, computes the phase shift $\phi$ of the vector signal having, as its components, the samples of signals V1*r* and V2*r* delivered by the resonating filters, in carrying out this computation by implementing the formula:

$$\phi = \text{Arctan}\,\frac{V2r}{V1r}$$

then determines the time lag ΔT of the reference instant with respect to that of the appearance of the signal edge by implementing the formula:

$$\Delta T = T \times \frac{\phi}{2\pi}$$

The reference instant may be defined by the appearance of another signal edge. In this case, another object of the invention is a device for the measurement of time lags between two signal edges having a maximum time lag between them, said device comprising:

a first input channel receiving a first signal edge and comprising, in parallel, a first resonating filter which is tuned to a period T' at least equal to the maximum time lag and generates a cosinusoidal signal V'1 in response to an excitation by a signal edge, and a second resonating filter which is tuned to the same period T' as the first resonating filter and generates a sinusoidal signal V'2 in response to an excitation by a signal edge;

a second input channel receiving the second signal edge and comprising, in parallel, like the first input channel, a first resonating filter which is tuned to the same period T' as the resonating filters of the first input channel and generates a cosinusoidal signal V'3 in response to an excitation by a signal edge, and a second resonating filter which is tuned to the same period T' as the resonating filters of the first channel and generates a sinusoidal signal V'4 in response to an excitation by a signal edge;

a circuit to detect the passage of the signal edges, with two inputs parallel connected to those of the two input channels that get triggered after the passage of the two edges;

a sampling circuit that is triggered by the detection circuit after the passage of the two edges and that simultaneously samples the output signals from the resonating filters and delivers the values V'1*e*, V'2*e*, V'3*e*, V'4*e* and a computation circuit, which receives the samples V'1*e*, V'2*e*, V'3*e*, V'4*e* delivered by the sampling circuit, computes the phase shift $\phi'1e$ of the vector signal having, as its components, the samples V'1*e* and V'2*e* of the signals from the resonating filters of the first input channel by implementing the formula:

$$\phi'1e = \text{Arctan}\,\frac{V'2e}{V'1e}$$

computes the phase shift $\phi'2e$ of the vector signal having, as its components, the samples V'3*e* and V'4*e* of the signals from the resonating filters of the second input channel by implementing the formula:

$$\phi'2e = \text{Arctan}\,\frac{V'4e}{V'3e}$$

computes the phase difference $\phi'2r-\phi'1e$ and the time lag _T of the second signal edge with respect to the first signal edge by implementing the formula:

$$\Delta T = T \times \frac{\phi'2e - \phi'1e}{2\pi}$$

Each resonating filter with a cosinusoidal response is advantageously constituted by an oscillating circuit excited by means of an input amplifier stage with low output impedance behaving like a voltage source.

Each resonating filter with a sinusoidal response is advantageously constituted by a parallel oscillating circuit excited by means of an input amplifier stage with high output impedance behaving like a current source.

BRIEF DESCRIPTION OF THE DRAWINGS

Other descriptions and advantages of the present invention shall emerge from the description of two embodiments, given by way of an example. This description shall be given here below with reference to the drawings, wherein.

DETAILED DESCRIPTION OF THE INVENTION

Figure 1:
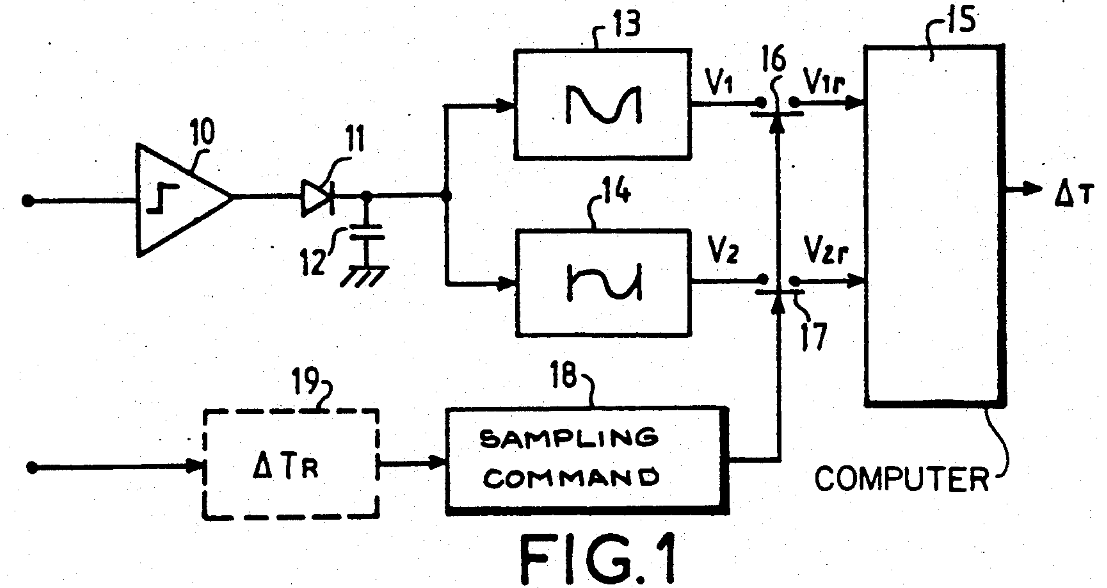
FIG. 1 shows a diagram of a time lag measuring circuit according to the invention.

FIG. 1 shows a circuit to measure the time lag of a reference instant with respect to a signal rising edge. This circuit has, at input, a channel for the processing of the signal rising edge formed by a limiting amplifier 10 followed by a descending edge suppression circuit with series-connected diode 11 and parallel-connected capacitor 12, and two parallel-connected resonating filters 13, 14. The outputs of these filters lead to a computer 15 by means of two sampling switches 16, 17 activated by a sampling activation circuit 18 which is triggered, through a delay circuit 19 if necessary, by an acquisition signal such as a calibrated pulse identifying the reference instant.

The limiting amplifier 10 makes it possible to do away with the differences in amplitude that may affect the rising edge of the signal.

The descending edge suppression circuit with series-connected diode 11 and parallel-connected capacitor 12, which is placed before the inputs of the resonating filters 13 and 14, prevents a signal descending edge from disturbing the resonating filters 13, 14.

The resonating filters 13, 14 are tuned to a same frequency Fr, the period T of which is at least equal to the maximum duration of the time lag to be measured. In response to a signal rising edge, one resonating filter 13 generates a cosinusoidal response V1 and the other resonating filter 14 generates a sinusoidal response V2. These responses V1 and V2, which are two sinusoidal signals of the same amplitude and the same frequency triggered in quadrature, may be considered to be the real and imaginary components of a complex vector with a substantially constant modulus if the overvoltage coefficient is sufficiently high, the phase of said complex vector developing linearly in the course of time from the instant of excitation onwards. By sampling these responses V1 and V2 at the instant of reference, values V1*r* and V2*r* are obtained, from which it is possible to deduce a phase value $\phi$ by the formula:

$$\phi = \text{Arctan}\,\frac{V2r}{V1r}$$

which corresponds to the time that has elapsed since the excitation of the resonating filters 13, 14, i.e. corresponds to the time lag $\Delta T$ of the reference instant with respect to the signal rising edge by the formula:

$$\Delta T = \phi \frac{T}{2\pi}$$

The sampling switches 16, 17 are closed for a short period at the reference instant in order to give the computer 15 the sampled values V1*r* and V2*r* from which, by implementing the above formulae, it deduces the value of the time lag $\Delta T$ of the reference instant with respect to the signal rising edge.

The delay circuit 19, which may be placed if necessary before the sampling control circuit in the path of the acquisition signal identifying the reference instant, is used if the reference instant should be ahead of the rising edge of the signal. In this case, the acquisition signal is delayed by a value $\Delta Tr$ sufficient for it to be always delayed with respect to the signal rising edge and this value $\Delta Tr$ is deducted from the computed value $\Delta T$.

After the acquisition of the samples, it is advantageous to use a zero-setting device that discharges the energy of the resonating filters and of the lengthening capacitor 12 to permit a new measurement. This avoids having to wait for the natural discharge of the energies from the resonating filters and from the lengthening capacitor.

Figure 2:
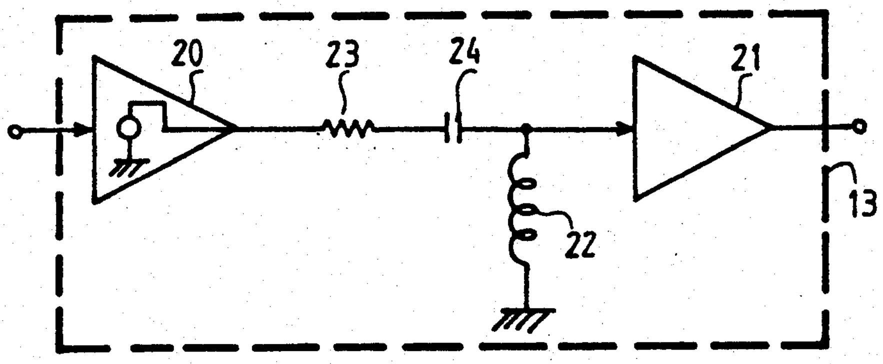
FIG. 2 shows a detailed view of a possible embodiment of a resonating filter with cosinusoidal response.

FIG. 2 illustrates a possible embodiment of the resonating filter 13 generating a cosinusoidal signal in response to a signal rising edge. This filter 13 comprises an input amplifier stage 20 with high input impedance and low output impedance behaving like a voltage source, followed by an oscillating circuit and an output amplifier stage 21 with high input impedance. The oscillating circuit is formed, firstly, by means of an inductor 22 connected between the input of the output amplifier stage 21 and the ground and, secondly, by means of a resistor 23 in series with a capacitor 24 which are positioned in the order given between the output terminal of the input amplifier stage 20 and the input terminal of the output amplifier stage 21.

Assuming that the oscillator circuit is tuned to the pulsation $w_1$, it can be shown that the response $e_1(t)$ of this resonating filter at a step U(t) of peak voltage Vc has the form:

$$e_1(t) = U(t)\,[Vc\, e^{-\alpha t} \cos w_1 t]$$

with $e^{-\alpha t}$ close to 1 for a high overvoltage coefficient equal to or greater than 100.

For an oscillation period of 100 ns it is possible, for example, to choose a value of 25 $\mu$H for the inductor 22, a value of 15 $\Omega$ for the resistor 23 and a value of 10 pf for the capacitor 24. We then obtain a overvoltage coefficient of 100 and a resonance frequency equal to 10 MHz.

Figure 3:
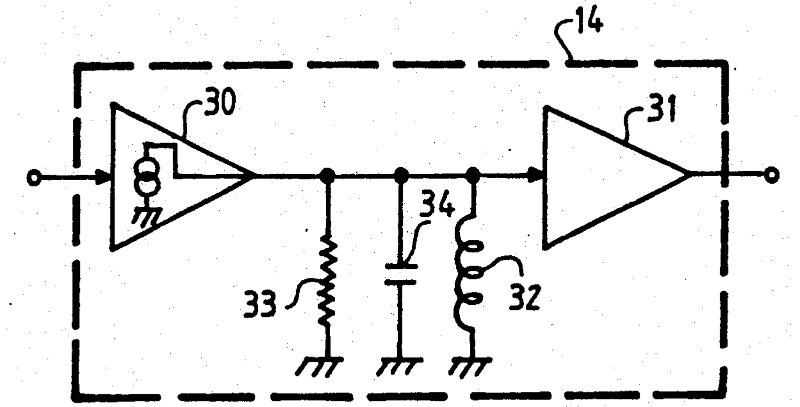
FIG. 3 shows a detailed view of a possible embodiment of a resonating filter with sinusoidal response.

FIG. 3 illustrates a possible embodiment of the resonating filter 14 generating a sinusoidal signal in response to a signal rising edge. This filter 14 comprises an input amplifier stage 30 with high input and output impedance behaving like a current source, followed by an oscillating circuit and an output amplifier stage 31 with high input impedance. The oscillating circuit is formed by means of an inductor 32, a resistor 33 and a capacitor 34 which are parallel connected between the ground and the input terminal of the output amplifier 31 which is itself connected to the output terminal of the input amplifier stage 30.

Assuming that the oscillator circuit is tuned to the pulsation $w_1$, it can be shown that the response $e_2(t)$ of this resonating filter at a step U(t) of peak voltage Vc has the form:

$$e2(t) = U(t)\,[Vc\, e^{-\alpha t} \sin w1t]$$

with $e^{-\alpha t}$ close to 1 for a high overvoltage coefficient equal to or greater than 100.

For an oscillation period of 100 ns as chosen above, it is possible, for example, to give the inductor 32 a value of 25 μH, the resistor 33 a value of 1.5 $10^5$ Ω and the capacitor 34 a value of 10 pf. We then obtain a overvoltage coefficient of 100 and a resonance frequency equal to 10 MHz.

It is noted that, in these exemplary embodiments, the two resonating filters 13, 14 are dual with a voltage/current duality.

Figure 4:
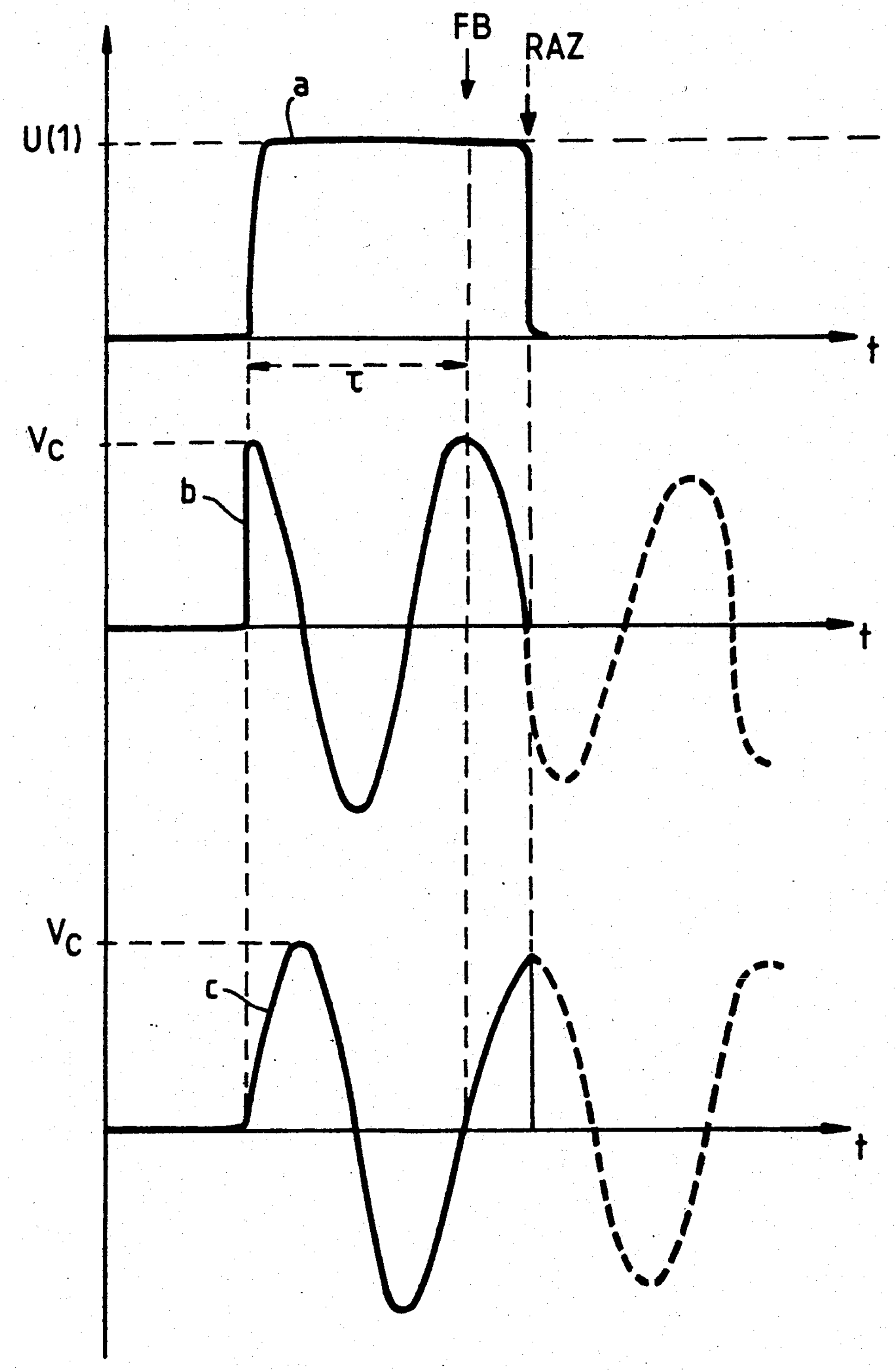
FIG. 4 shows a graph of curves illustrating the working of the resonating filters of FIGS. 2 and 3.

FIG. 4 illustrates the shape of the responses of the resonating filters 13, 14 at an excitation step. The curve "a" represents the shape of the excitation step assumed to be applied simultaneously to the inputs of the resonating filters 13, 14. The curve "b" represents the cosinusoidal shape of the response of the resonating filter 13 tuned to the frequency 1/T. The curve "c" represents the sinusoidal shape of the response of the resonating filter 14 tuned to the frequency 1/T. It is observed that these responses are two sinusoidal signals with the same amplitude and the same frequency triggered in quadrature which may be considered to be the real and imaginary components of a complex vector having a substantially constant modulus, the phase of said complex vector developing linearly in the course of time from the excitation instant onwards at the speed 2π'/T. Through its linear development in the course of time, this phase may be used to measure the lapse of time between the instant of excitation of the resonating filters and the instant of sampling of their responses.

Figure 5:
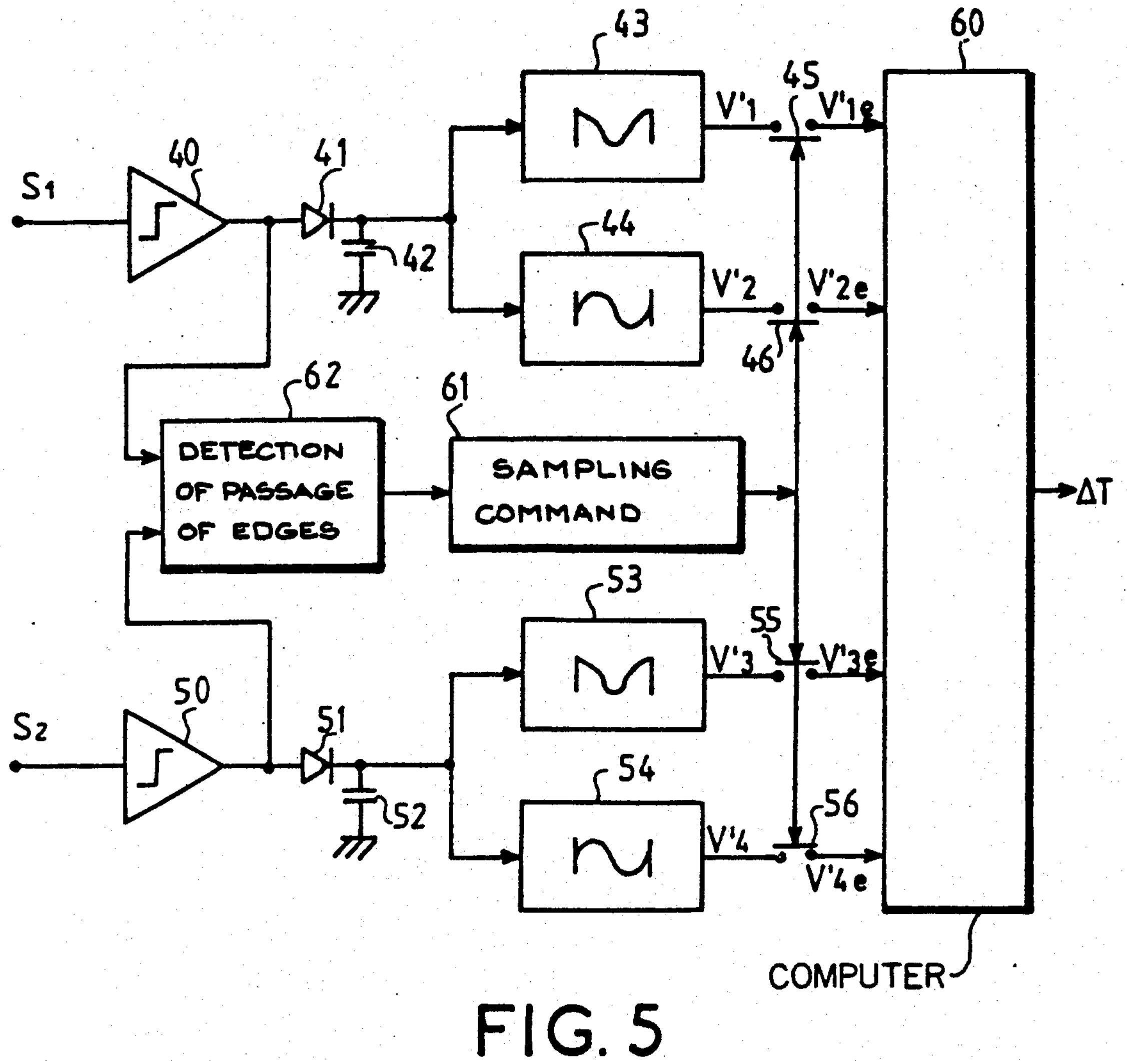
FIG. 5 shows a diagram of another time lag measuring circuit according to the invention.

FIG. 5 shows a circuit for the measurement of the time lag between two signal rising edges S1, S2. At input, this circuit has two channels for the parallel processing of the rising edges of the signals S1 and S2. These two channels are formed identically, each comprising an input limiting amplifier 40, 50 followed by a descending edge suppression circuit with series-connected diode 41, 51 and parallel-connected capacitor 42, 52, and two resonating filters 43, 44; 53, 54 placed in parallel. The outputs of the four resonating filters 43, 44; 53, 54 of the two input channels lead to a computer 60 by means of sampling switches 45, 46, 55, 56 activated by a sampling activation circuit 61, itself triggered by a circuit 62 for detecting the passage of the edges, said circuit 62 having two inputs connected to the output of the limiting amplifiers 40, 50.

In each of the input channels, the limiting amplifier 40, 50 makes it possible to do away with the amplitude differences that may affect a signal rising edge. The descending edge suppression circuit with series-connected diode 41, 51 and parallel-connected capacitor 42, 52 prevents a disturbance of the resonating filters 43, 44; 53, 54 by a signal descending edge.

All the resonating filters 43, 44, 53, 54 of the two input channels are tuned to a same frequency, the period T' of which is at least equal to the maximum duration of the time lag to be measured between the two edges and is preferably equal to this maximum duration plus the operating time of the circuit 62 for detecting the passage of the edges. The resonating filters 43 and 53 are identical and, in response to a signal rising edge, they generate a cosinusoidal output signal V'1, V'3. The resonating filters 44 and 54 are identical and, in response to a signal rising edge, they generate a sinusoidal output signal V'2, V'4.

The responses V'1 and V'2 of the resonating filters 43, 44 of the input channel receiving the signal S1 are two sinusoidal signals with the same amplitude and the same frequency, triggered in quadrature, which may be considered as the real and imaginary components of a first complex vector with substantially constant modulus, the phase φ'1 of said complex vector developing linearly in the course of time starting from the instant of excitation by the rising edge of the signal S1.

This is also true for the responses V'3 and V'4 of the resonating filters 53, 54 of the input channel receiving the signal S2 which are two sinusoidal signals with the same amplitude and the same frequency, triggered in quadrature, which may be considered as the real and imaginary components of a second complex vector with a substantially constant modulus, the phase φ'2 of said complex vector developing linearly in the course of time, at the same speed as the first vector, but starting from an instant of excitation corresponding to the rising edge of the signal S2.

The phase difference φ'2–φ'1 between these two complex vectors is constant for the duration of the responses of the resonating filters 43, 44, 53, 54 and is proportional to the time lag ΔT of the rising edge of the signal S2 with respect to the rising edge of the signal S1:

$$\Delta T = T \times \frac{\phi'2 - \phi'1}{2\pi}$$

It can be measured at any instant, once the four resonating filters 43, 44, 53, 54 have been excited. The measurement is done by the sampling of the output signals from the resonating filters by means of the sampling switches 45, 46, 55, 56 which deliver samples V'1*e*, V'2*e*, V'3*e* and V'4*e* to the computer 60.

The instant of measurement is determined by the circuit 62 for detecting the passage of the edges. This circuit 62 does not have to be very precise since the phase difference between the two complex vectors, the components of which are delivered by the resonating filters, remains practically constant throughout the duration of the response of the resonating filters. This circuit may be constituted, for example, by two astable flip-flop circuits triggered by signal edges and followed by an AND gate type logic assembly.

After the acquisition of the information elements, a zero-setting operation makes the circuit available for another measurement.

The computer 60, which receives the samples V'1*e*, V'2*e*, V'3*e*, V'4*e* of the responses from the resonating filters, computes the phase shift φ'1*e* of the vector signal having, as its components, the samples V'1*e*, V'2*e* of the signals from the resonating filters 43, 44 of the first input channel receiving the first signal rising edge of the signal S1. It does this computation by implementing the formula:

$$\phi'1e = \mathrm{Arctan}\,\frac{V'2e}{V'1e}$$

It also computes the phase shift φ'2*e* of the vector signal having, as its components, the samples V'3*e*, V'4*e* of the signals from the resonating filters 53, 54 of the second input channel receiving the second signal rising edge of the signal S2. It does this computation by implementing the formula:

$$\phi'2e = \mathrm{Arctan}\,\frac{V'4e}{V'3e}$$

It then computes the phase difference $\phi'2e - \phi'1e$ and the time lag ΔT of the second signal edge S2 with respect to the first signal edge S1 by implementing the formula:

$$\Delta T = T \frac{\phi'2e - \phi'1e}{2\pi}$$

To avoid any uncertainty, it is seen to it, by an appropriate choice of the resonance period T' of the resonating filters, that this period T' is greater than the maximum duration of the time lag to be measured between the two edges plus the operating time of the circuit for detecting the passage of the edges, so that the sampled phase shift values $\phi'2e$ and $\phi'1e$ remain smaller than $2\pi$.

To increase the dynamic range of measurement of the time lags, it is possible to consider the use, in parallel, of several pairs of cosinusoidal and sinusoidal resonating filters tuned to staggered periods. This may be useful in a angular distance measurement device or goniometrical device where it is sought to reconcile a wide range of off-axis aiming with precise measurements around zero.

The measurement of the time lag between two signal edges by means of the resonating filters makes it possible to determine very small time lags. Indeed, if a resonance period of 100 ns is adopted for the resonating filters, a time lag of 1 ns is expressed by an angular distance to be measured of the order of 3°36' which can be measurement without excessive difficulty on the 10 MHz output signals of the resonating filters.

The devices that have just been described can be applied to a variety of fields where the signal edges may have varied (for example electromagnetic, acoustic, luminous or other) origins. An exemplary application is in the field of non-ambiguous goniometry by arrival times of pulses of radar or sonar transmitters by means of omnidirectional antenna arrays spaced out at an appropriate distance according to a known arrangement. Other applications relate to angular tracking by angular distance measurement, telemetry and short-range altimetry.

What is claimed is:

1. An electronic device for the measurement of the time lag between a reference instant and a signal edge having a maximum time lag with respect to each other, said device comprising:

an input channel receiving the signal edge and comprising, in parallel, a first resonating filter which is tuned to a period T at least equal to the maximum time lag and generates a cosinusoidal signal V1 in response to an excitation by a signal edge, and a second resonating filter which is tuned to the same period T as the first resonating filter and generates a sinusoidal signal V2 in response to an excitation by a signal edge;

a sampling circuit, triggered at the reference instant, which delivers simultaneously samples V1*r* and V2*r* of the output signals V1 and V2 of the resonating filters and a computation circuit which receives the samples V1*r* and V2*r* delivered by the sampling circuit, computes the phase shift $\phi$ of the vector signal having, as its real and imaginary components, the samples V1*r* and V2*r*, in carrying out this computation by implementing the formula:

$$\phi = \mathrm{Arctan}\frac{V2r}{V1r}$$

and determines the time lag ΔT of the reference instant with respect to that of the appearance of the signal edge by implementing the formula:

$$\Delta T = \phi \times \frac{T}{2\pi}.$$

2. A device according to claim 1, wherein the first resonating filter comprises an oscillating circuit excited by means of an input amplifier stage with low output impedance behaving as a voltage source.

3. A device according to claim 1, wherein the second resonating filter comprises a parallel oscillating circuit excited by means of an input amplifier stage with high output impedance behaving as a current source.

4. A device according to claim 1, comprising a limiting amplifier at the head of the input channel.

5. A device according to claim 1 comprising, in the input channel, at the head of the resonating filters, a descending edge suppression circuit with series-connected diode and parallel-connected capacitor.

6. An electronic device for the measurement of time lags between two signal edges having a maximum time lag between them, said device comprising:

a first input channel receiving a first signal edge and comprising, in parallel, a first resonating filter which is tuned to a period T' at least equal to the maximum time lag and generates a cosinusoidal signal V'1 in response to an excitation by a signal edge, and a second resonating filter which is tuned to the same period T' as the first resonating filter and generates a sinusoidal signal V'2 in response to an excitation by a signal edge;

a second input channel receiving a second signal edge and comprising, in parallel, a first resonating filter which is tuned to the same period T' as the resonating filters of the first input channel and generates a cosinusoidal signal V'3 in response to an excitation by a signal edge, and a second resonating filter which is tuned to the same period T' as the resonating filters of the first channel and generates a sinusoidal signal V'4 in response to an excitation by a signal edge;

a circuit to detect the passage of the signal edges, with two inputs parallel connected to the inputs of the two input channels;

a sampling circuit, triggered by the detection circuit which delivers simultaneous samples V'1*e*, V'2*e*, V'3*e*, V'4*e* of the output signals V'1, V'2, V'3, V'4 from the resonating filters of the two input channels and a computation circuit, which receives the samples V'1*e*, V'2*e*, V'3*e*, V'4*e* delivered by the sampling circuit, computes the phase shift $\phi'1e$ of the vector signal having, as its real and imaginary components, the samples V'1*e* and V'2*e* of the signals V'1 and V'2 delivered by the resonating filters of the first input channel by implementing the formula:

$$\phi'1e = \mathrm{Arctan}\frac{V'2e}{V'1e}$$

computes the phase shift $\phi'2e$ of the vector signal having, as its components, the samples V'3*e* and V'4e of the signals V'3 and V'4 delivered by the resonating filters of the second input channel by implementing the formula:

$$\phi'2e = \text{Arctan}\,\frac{V'4e}{V'3e}$$

computes the phase difference $\phi'2e-\phi'1e$ and the time lag $\Delta T$ of the second signal edge with respect to the first signal edge by implementing the formula:

$$\Delta T = (\phi'2e - \phi'1e)\frac{T}{2\pi}.$$

7. A device according to claim 6, wherein the first resonating filters of the two input channels each comprise an oscillating circuit excited by means of an input amplifier stage with low output impedance behaving as a voltage source.

8. A device according to claim 6, wherein the second resonating filters of the two input channels comprise a parallel oscillating circuit excited by means of an input amplifier stage with high output impedance behaving as a current source.

9. A device according to claim 6, comprising a limiting amplifier at the head of each of the two input channels.

10. A device according to claim 6 comprising, in the input channel, at the head of the resonating filters, a descending edge suppression circuit with series-connected diode and parallel-connected capacitor.

* * * * *